3,396,065
Patented Aug. 6, 1968

3,396,065
PROCESS OF BONDING TEXTILE MATERIALS TO RUBBER
Eric Alexander Ney, Nunawading, Australia, assignor to Dunlop Rubber Company Limited, London, England, a British company
No Drawing. Filed Oct. 28, 1964, Ser. No. 407,211
Claims priority, application Australia, Nov. 13, 1963, 37,635/63
19 Claims. (Cl. 156—335)

ABSTRACT OF THE DISCLOSURE

Textile materials can be bonded to rubbers using as the adhesive composition an aqueous dispersion of an incompletely condensed phenolic resin and a copolymer prepared from allylamine and at least one conjugated diene monomer.

---

This invention relates to the bonding of textile materials to rubber. It also relates to a method of producing such bonded laminates and it further relates to adhesive compositions for use in bonding textile materials to rubber to produce the bonded articles first referred to.

Certain types of rubber articles are specifically designed to withstand considerable stresses which are encountered in their use; articles exemplified by rubber hoses, belts and motor car tyres are generally produced by reinforcing the rubber body whereof they are made with plies of comparatively inextensible textile material.

Articles as above exemplified are commonly reinforced with filamentary textiles in the form of yarns, cords or fabrics.

It is particularly important in the production of such articles that the plies of textile reinforcing material should be firmly adhered to the rubber intermediate the textile plies and should remain effectively adhered even when the article is subjected to repeated and varying strains during use since any separation of the plies or relative movement between the rubber and textile parts will lead to abrasion of the parts and result in early failure of the article.

It is a major object of the present invention to provide a method for adhering textile material to rubber, for example in the production of plies of tyre cord fabric and its adhesion to tyre carcass compositions.

In achieving this object it is therefore a further object of the invention to provide an aqueous dipping composition for tyre cord and fabrics to improve their adhesion to tyre carcass compositions under the conditions described above.

According to the present invention an adhesive composition comprises an admixture in aqueous dispersion of an incompletely condensed phenolic resin and a copolymer prepared from allylamine and at least one conjugated diene monomer and using a monomer charge containing from 2 percent to 30 percent by weight of allylamine based on the total monomer content.

According to the present invention also there is provided a method of bonding a textile material to a rubber composition which comprises dipping said textile material in an aqueous adhesive composition as described in the immediately preceding paragraph, removing excess of said adhesive composition, drying the treated textile material, applying said treated textile material to a rubber composition and vulcanizing the rubber composition by heating.

The textile material to which the present invention relates may be exemplified by rayon, nylon, and polyester filamentary textiles in the form of yarns, cords or fabrics. The rubber composition to which the process is applicable in particular is a natural rubber composition; the process may, however, also be applied to compositions based on a wide variety of synthetic rubbers.

It has been found that the use of allylamine copolymer latices is of particular value when adhering polyester type cords or fabrics to tyre carcass compositions, and in carrying out the process of the invention one of the main difficulties in the manufacture of polyester reinforced tyres is overcome thereby.

Allylamine copolymers which come within the scope of the invention are copolymers prepared from allylamine together with one or more conjugated dienes and also copolymers of allylamine, one or more conjugated dienes together with any copolymerizable vinyl compound or compounds.

As used herein the term "allylamine copolymer" designates copolymers prepared from monomer charges containing from 2 percent to 30 percent and preferably from 10 percent to 20 percent of allylamine and irrespective of to what extent actual incorporation of allylamine has occurred.

The copolymer of the invention may be prepared according to many of the standard polymerization procedures known in the art; however, it is preferred to procede as follows:

| | Parts by weight |
|---|---|
| Monomers including allylamine | 100.0 |
| Potassium myristate | 5.0 |
| Para-menthane hydroperoxide | 0.1 |
| Sodium formaldehyde sulfoxylate | 0.1 |
| Ferric nitrate $(Fe(NO_3)_3 \cdot 9H_2O)$ | 0.014 |
| Disodium diaminotetraacetic acid | 0.02 |
| Potassium chloride | 0.5 |
| Water | 180.0 |

The listed polymerization ingredients are placed into a polymerization vessel and polymerized whilst undergoing vigorous stirring at 5° C. to approximately 80 percent conversion when polymerization is terminated by addition of a short stopping agent. The latex is then diluted to a total solids content of 20 percent, the concentration used in the preparation of the dipping compositions described in the examples hereinafter.

In order to prepare an aqueous dipping composition as referred to above in accordance with the invention, an allylamine copolymer latex prepared as indicated above is mixed with a partially matured resorcinol-formaldehyde resin solution.

Whilst the ratio of allylamine copolymer latex to resorcinol-formaldehyde resin solution to produce useful dipping compositions is not critical within certain limits it becomes critical when these limits are exceeded. It is preferred that such compositions should contain from 10 to 60 parts by weight dry of resin to 100 parts by weight of allylamine copolymer.

The application of the dipping composition to cord or fabric may be carried out in any of the ways customary and well known in the art and reference to particularly preferred methods of procedure is made in the examples herebelow.

When nylon cords of denier rating used for tyre reinforcement are treated with the dipping composition in accordance with the invention, and more particularly described in the examples below, tests according to ASTM Tentative Specification D-2138-62T showed that failure of the assembly invariably occurs in the cord.

It has also been found that allylamine copolymer latices containing 0.25 equivalents (approximately 15 g.) of allylamine per 100 grams of original monomer charge may be diluted up to 4 times with butadiene/styrene latices without appreciably impairing adhesion of nylon cords in the test performed as described above. Such latices when diluted fully as described have only one-fifth of the original allylamine content, being an amount of allylamine, contained in 100 grams of the final elastomers, equivalent to an original monomer charge of about 3 grams of allylamine.

When polyester cords, for example polyethylene glycol terephthalate cords, are treated with a dipping composition as described above subsequent H-block assembly tests show that failure is usually of an adhesive nature; this failure, however, is not entirely due to the dipping composition but rather to the nature of the surfaces requiring treatment.

It has thus further been found that adhesion of polyester type cords to tyre carcass compositions is greatly improved, beyond the improvement shown above, when the dipping composition treatment described above is preceded by a treatment with an allylamine dipping composition containing a bi-functional compound capable of reacting with free amino groups.

Examples of bi-functional compounds capable of reacting with free amino groups are diepoxides, which are preferred; glycols, anhydrides, bi-functional carboxylic acids, isocyanates and halides may also be used.

Polyester tyre cords treated with the two allylamine copolymer dipping compositions, applied as described in the following examples, show cord failure in H-block tests as recorded in the Examples I to IV.

When cords of heavier denier rating were tested, failure occurred in the rubber stock. In both cases the type of failure was cohesive, and adhesive failure was not encountered. The following examples illustrate the main aspects of our invention. All parts are by weight.

EXAMPLE I

A terpolymer latex was prepared from a monomer charge consisting of allylamine 15 parts, styrene 15 parts and butadiene 70 parts according to the recipe set out above and the latex was diluted to a 20 percent total solids content.

A resorcinol-formaldehyde resin solution was then prepared from the following ingredients: water 2750 parts, resorcinol 100 parts, formaldehyde 93 parts dry, sodium hydroxide 16.7 parts dry. All the ingredients were added to the water in the order as set out above. Time is allowed after each addition for dissolution to occur. The formaldehyde and sodium hydroxide were added as aqueous solutions. The resin solution was then matured for three hours, under agitation, at 70° F.

A dipping composition was prepared by adding 62 parts of allylamine copolymer latex to 100 parts of matured resorcinol-formaldehyde resin solution and the dip left to mature for one hour.

The dipping composition so prepared was then applied in the following manner to 2/840 denier nylon tyre cord. The cord was treated with the dipping composition under slight tension for 10 seconds, a 3 percent elongation applied and excess dip gently vibrated off. The treated cord was then dried for 2 minutes at 200° C. in an air oven, after which the tension was released. The treated cords were then moulded into ⅜-inch H-blocks against a carcass type composition of the following formulation:

| | |
|---|---|
| Natural rubber | 100 |
| General purpose furnace black | 50 |
| Mineral oil | 10 |
| Stearic acid | 1 |
| Zinc oxide | 7 |
| Sulphur | 3 |
| Accelerator | 0.6 |
| Retarder | 0.6 |

The moulded H-blocks were then cured for 30 minutes at 280° F. 100 percent cord failure occurred.

EXAMPLE II

The steps described in Example I were repeated except that the allylamine copolymer latex used was diluted four times with a 50/50 butadiene/styrene latex commercially available as Polysar Type IV latex, which was also adjusted to a 20 percent total solids content. Cord failure was 80 percent. The rest was adhesive failure at 30 to 32 lbs.

EXAMPLE III

The steps described in Example I were repeated except that a 2/1000 denier polyethylene glycol terephthalate cord and an oven temperature of 240° C. were used. Cord failure was 25 percent. The rest was adhesive failure at 22 to 25 lbs.

EXAMPLE IV

The allylamine terpolymer latex described in Example I was used to prepare the following dipping composition:

| | |
|---|---|
| Allylamine copolymer latex (20% total solids) | 100.0 |
| Sodium lauryl sulphate (30% active paste) | 0.8 |
| Epikote 812 | 1.0 |
| Water | 100.0 |

Epikote 812 is the trade name of a commercially available epichlorhydrin resin.

In preparing the dipping composition, the epoxy resin and surfactant were first intimately blended, then the water was added and a solution allowed to form. Only after formation of such a solution was the addition of the allylamine copolymer latex made. The dipping composition was ready for use on completion of mixing.

Polyethylene glycol terephthalate polyester cords of 2/1000 denier were treated with the above dipping composition for 10 seconds. The cords were removed from the dip, a 3 percent stretch applied and excess dip vibrated off. The stretched cords were heat-dried for 2 minutes at 230° C. in an air oven after which the tension was released.

A resorcinol-formaldehyde resin solution was then prepared as for Example I except that 62 parts of formaldehyde to 100 parts of resorcinol were used. The prepared resorcinol-formaldehyde resin solution was then mixed with allylamine copolymer latex, 20 percent total solids, in the proportion of 62 parts of latex to 100 parts of resin solution and the mixture left to mature for one hour.

A 0.6% elongation was then applied to the 2/1000 denier polyester cords already treated with the allylamine copolymer epoxy composition and the cords were then treated for 10 seconds with the allylamine copolymer resorcinol-formaldehyde resin dipping composition. After excess dip had been removed by vibration the cords were heat-dried for 1 minute at 230° C. under tension.

When the twice dipped cords were tested in the H block test as described in Example I, 100 percent cord failure resulted.

EXAMPLE V

A terpolymer latex was prepared using the same monomers in the same proportions as for Example I but according to the following formulation:

| | |
|---|---|
| Allylamine | 15.0 |
| Styrene | 15.0 |
| Butadiene | 70.0 |
| Potassium myristate | 5.0 |
| Ferrous sulphate ($FeSO_4 \cdot 7H_2O$) | 0.238 |
| Potassium citrate | 0.675 |
| Sodium hydrosulphite | 0.02 |
| Potassium hydroxide | 0.15 |
| Potassium chloride | 0.125 |
| Para-menthane hydroperoxide | 0.15 |
| Water | 180.0 |

The resulting allylamine copolymer latex was adjusted to a 20 percent total solids content and two dipping compositions were prepared therefrom as described in Example IV. A 2/1000 denier polyethylene glycol terephthalate cord was dipped first in the allylamine copolymer epoxy composition and treated as in Example IV except that half the cord was heat dried for only 1 minute at 230° C. in an air oven and the other half of the cord was dried in a fluidised bed for only 12 seconds at 230° C. Both sections of cord were then treated as for Example IV with the allylamine copolymer resorcinol-formaldehyde resin dipping composition prepared for this Example V. The cord dried in the oven after the first stage was again dried in the oven, for one minute, at 230° C. after the second dip treatment; the other cord was again dried in the fluidised bed, but only for 8 seconds.

The cords were then adhered to the rubber composition and the strength of the bonds between the cords and the rubber composition were measured by the pull-through test described by J. O. Wood, Trans. I.R.I., 32,1, 1 to 18 (1956). The oven-dried cords required a pull-through force of 17.8 lbs. and the fluidised bed-dried cords 18.5 lbs., these figures being each the average result from 20 pull-through tests.

Having now described my invention, what I claim is:

1. An adhesive composition which comprises an admixture in aqueous dispersion of an incompletely condensed phenolic resin and a copolymer prepared from allylamine and at least one conjugated diene monomer and using a monomer charge containing from 2 percent to 30 percent by weight of allylamine based on the total monomer content.

2. An adhesive composition according to claim 1 wherein the monomer charge contains from 10 percent to 20 percent by weight of allylamine.

3. An adhesive composition according to claim 1 wherein the monomer charge contains also at least one further copolymerisable vinyl monomer.

4. An adhesive composition according to claim 3 wherein the copoymerisable vinyl monomer is styrene.

5. An adhesive composition according to claim 1 wherein the incompletely condensed phenolic resin is a soluble resorcinol-formaldehyde resin.

6. An adhesive composition according to claim 5 wherein the resorcinol content is from 25 to 30 parts by weight based upon 100 parts by weight of allylamine copolymer.

7. An adhesive composition according to claim 1 wherein said conjugated diene monomer is butadiene.

8. A method of bonding a textile material to a rubber composition which comprises dipping said textile material in an adhesive composition comprising an admixture in aqueous dspersion of an incompletely condensed phenolic resin and a copolymer prepared from allylamine and at least one conjugated diene monomer and using a monomer charge containing from 2 percent to 30 percent by weight of allylamine based on the total monomer content, removing excess of said adhesive composition, drying the treated textile material, applying said textile material to a rubber composition and vulcanizing the rubber composition by heating.

9. A method according to claim 8 wherein the monomer charge contains from 10 percent to 20 percent by weight of allylamine.

10. A method according to claim 8 wherein the monomer charge contains also at least one further copolymerisable vinyl monomer.

11. A method according to claim 10 wherein the copolymerisable vinyl compound is styrene.

12. A method according to claim 8 wherein the incompletely condensed phenolic resin is a soluble resorcinol-formaldehyde resin.

13. A method according to claim 12 wherein the resorcinol content is from 25 to 30 parts by weight based upon 100 parts by weight of allylamine copolymer.

14. A method according to claim 8 wherein the conjugated diene monomer is butadiene.

15. A method according to claim 8 wherein the textile material is a nylon cord.

16. A method according to claim 15 wherein the allylamine copolymer latex is diluted up to four times with a butadiene/styrene latex before mixing with the incompletely condensed phenolic resin.

17. A method according to claim 8 wherein the textile material is a polyethylene glycol terephthalate cord.

18. A method according to claim 17 wherein the polyethylene glycol terephthalate cord is first treated with an allylamine copolymer latex containing a bi-functional compound capable of reacting with free amino groups and the cord is dried before treatment with the adhesive composition.

19. A method according to claim 18 wherein the bi-functional compound is a diepoxide.

References Cited

UNITED STATES PATENTS

| | | | |
|---|---|---|---|
| 3,125,462 | 3/1964 | Rachinsky | 117—139.5 |
| 2,417,975 | 3/1947 | Ebers | 156—110 |
| 2,429,397 | 10/1947 | Compton | 156—110 |
| 2,689,844 | 9/1954 | Melamed | 161—241 X |
| 2,716,083 | 8/1955 | Tallis | 156—110 |
| 3,051,594 | 8/1962 | Aitken | 156—331 X |
| 3,190,764 | 6/1965 | Cardina | 156—110 |

EARL M. BERGERT, *Primary Examiner.*

CLIFTON B. COSBY, *Examiner.*